(12) United States Patent
Shiozaki et al.

(10) Patent No.: US 7,846,219 B2
(45) Date of Patent: Dec. 7, 2010

(54) ELECTRIC STORAGE DEVICE AND FABRICATING METHOD THEREFOR

(75) Inventors: Ryuji Shiozaki, Tokyo (JP); Nobuo Ando, Tokyo (JP); Satoko Kaneko, Tokyo (JP); Masahiko Taniguchi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 94 days.

(21) Appl. No.: 12/127,989

(22) Filed: May 28, 2008

(65) Prior Publication Data

US 2008/0299455 A1  Dec. 4, 2008

(30) Foreign Application Priority Data

May 30, 2007  (JP) .............................. 2007-142944

(51) Int. Cl.
  *H01M 10/38* (2006.01)
  *H01M 10/44* (2006.01)
  *H01M 4/04* (2006.01)
(52) U.S. Cl. ....................................... 29/623.1; 205/59
(58) Field of Classification Search ................ 29/623.1; 429/209, 122, 128, 194, 324; 205/59
 See application file for complete search history.

(56) References Cited

U.S. PATENT DOCUMENTS 4,615,960 A * 10/1986 Yata ............................ 429/324

2006/0057433 A1  3/2006 Ando et al.

FOREIGN PATENT DOCUMENTS

EP   1577914 A1 *  9/2005
WO   2004/059672 A1  7/2004

OTHER PUBLICATIONS

"Electrolysis Experiments", CR Scientific LLC, retrieved online on Apr. 16, 2010 from http://www.crscientific.com/electrolysis.html.*

* cited by examiner

*Primary Examiner*—Jonathan Crepeau
*Assistant Examiner*—Kenneth Douyette
(74) *Attorney, Agent, or Firm*—McDermott Will & Emery LLP

(57) ABSTRACT

An electrode laminate unit of an electric storage device is composed of positive electrodes and negative electrodes, which are alternately laminated, and a lithium electrode arranged at the outermost part of the electrode laminate unit so as to oppose the negative electrode. A charging/discharging unit having first and second energization control units connected to a positive-electrode terminal, negative-electrode terminal, and a lithium-electrode terminal. Electrons are moved from the lithium electrode to the positive electrode through the first energization control unit, and lithium ions are doped into the positive electrode from the lithium electrode. Electrons are moved from the lithium electrode to the negative electrode through the second energization control unit, and lithium ions are doped into the negative electrode from the lithium electrode. The lithium ions are doped into both of the positive and negative electrodes, whereby the doping time can be dramatically shortened.

3 Claims, 11 Drawing Sheets

FIG. 4  CHARGING/DISCHARGING EVALUATION (CHARGING)

SHORT-PERIOD STRUCTURE → SECURING DIFFUSION PATH OF LI⁺

LONG-PERIOD STRUCTURE → FACTOR OF INHIBITING DIFFUSION OF LI⁺

|  | NUMBER OF ELECTRODE | DOPING MODE | DOPING TIME (H) |
|---|---|---|---|
| EXAMPLE 1 | 3 | POSITIVE ELECTRODE-LITHIUM ELECTRODE NEGATIVE ELECTRODE-LITHIUM ELECTRODE | 13 |
| COMPARATIVE EXAMPLE 1 | 2 | NEGATIVE ELECTRODE-LITHIUM ELECTRODE | 35 |

ELECTRIC STORAGE DEVICE AND FABRICATING METHOD THEREFOR

CROSS-REFERENCE TO RELATED APPLICATIONS

The present application claims priority from Japanese Patent Application No. 2007-142944 filed on May 30, 2007, and is hereby incorporated by reference in its entirety.

BACKGROUND OF THE INVENTION

1. Field of the Invention

The present invention relates to a technology that is well adaptable to an electric storage device in which ions are doped into at least one of a positive electrode and a negative electrode.

2. Description of the Related Art

A high energy density or high output density is demanded for an electric storage device that is mounted to an electric vehicle, hybrid vehicle, or the like. Therefore, a lithium ion battery, hybrid capacitor, or the like have been proposed as a candidate for the electric storage device. Particularly, the lithium ion battery that employs vanadium oxide for the positive electrode is excellent in taking lithium ions therein. Accordingly, the lithium ion battery can remarkably increase an energy density.

There has been proposed that lithium ions are doped beforehand into a carbon material for a negative electrode, included in the lithium ion battery, so as to decrease a potential of the negative electrode, whereby an energy density is increased. In order to dope lithium ions into the negative electrode, a method of bringing a negative electrode and a metal lithium, which are opposite to each other, into an electrochemical contact has mostly been employed. Another proposal has been made in which through holes in which lithium ions pass are formed on a positive-electrode current collector or a negative-electrode current collector in order to smoothly move the lithium ions between the laminated electrodes (e.g., see International Publication 04/59672).

In the electric storage device disclosed in International Publication No. 04/59672, lithium ions can be smoothly doped. However, this device is configured to dope lithium ions into only a negative electrode, thereby entailing a problem that the doping time can be increased at the last stage when the doping capacity of the negative electrode is decreased. The increase in the doping time as described above entails not only the degradation in productivity of an electric storage device but also the increase in cost of an electric storage device.

SUMMARY OF THE INVENTION

An object of the present invention is to enhance productivity of an electric storage device by shortening an ion doping time.

A fabricating method of an electric storage device according to the present invention is a method in which ions are doped into at least either one of a positive electrode and a negative electrode, including a doping process in which the positive electrode and an ion source are connected to each other and the negative electrode and the ion source are connected to each other so as to dope ions into both of the positive electrode and the negative electrode from the ion source.

In the fabrication method of an electric storage device according to the present invention, an energizing state between the positive electrode and the ion source is controlled in the doping process by an energization control unit for the positive electrode.

In a fabricating method according to the present invention, an energizing state between the negative electrode and the ion source is controlled in the doping process by an energization control unit for the negative electrode.

An electric storage device according to the present invention is an electric storage device in which ions are doped into at least either one of a positive electrode and a negative electrode, and this electric storage device is fabricated by a doping process in which the positive electrode and an ion source are connected to each other and the negative electrode and the ion source are connected to each other so as to dope ions into both of the positive electrode and the negative electrode from the ion source.

In the electric storage device according to the present invention, an energizing state between the positive electrode and the ion source is controlled in the doping process by an energization control unit for the positive electrode.

In the electric storage device according to the present invention, in which in the doping process, according to the present invention, an energizing state between the negative electrode and the ion source is controlled in the doping process by an energization control unit for the negative electrode.

In the electric storage device according to the present invention, the positive electrode has a positive-electrode current collector and a positive electrode mixture layer, the negative electrode has a negative-electrode current collector and a negative electrode mixture layer, and through holes are formed on the positive-electrode current collector and the negative-electrode current collector.

In the electric storage device according to the present invention, a device structure is of a laminated type in which the positive electrode and the negative electrode are alternately laminated or a wound type in which the positive electrode and the negative electrode are wound as superimposed with each other.

In the electric storage device according to the present invention, the negative electrode contains at least either one of a soft carbon material and a graphite.

In the electric storage device according to the present invention, the positive electrode contains a vanadium oxide including layered crystal particles having a layer length of 1 nm or more and 30 nm or less.

In the electric storage device according to the present invention, the layered crystal particles are contained in any cross-section of the vanadium oxide in 30% or more in terms of an area ratio.

In the electric storage device according to the present invention, the vanadium oxide is water-soluble.

In the electric storage device according to the present invention, the vanadium oxide is prepared by evaporating and drying a water solution.

In the electric storage device according to the present invention, the vanadium oxide is treated at a temperature less than 250° C.

In the electric storage device according to the present invention, the vanadium oxide has a peak within the range of 5 to 15° at a diffraction angle $2\theta$ of X-ray diffraction pattern.

In the electric storage device according to the present invention, the vanadium oxide is treated by using a lithium ion source.

In the electric storage device according to the present invention, the positive electrode contains a conductive material.

According to the present invention, the positive electrode and the ion source are connected to each other and the negative electrode and the ion source are connected to each other so as to dope ions into both of the positive electrode and the negative electrode from the ion source. Therefore, the ion doping time for the electric storage device can be shortened. Accordingly, the productivity of the electric storage device can be enhanced, whereby the fabrication cost of the electric storage device can be reduced.

DETAILED DESCRIPTION OF THE PREFERRED EMBODIMENTS

Figure 1:
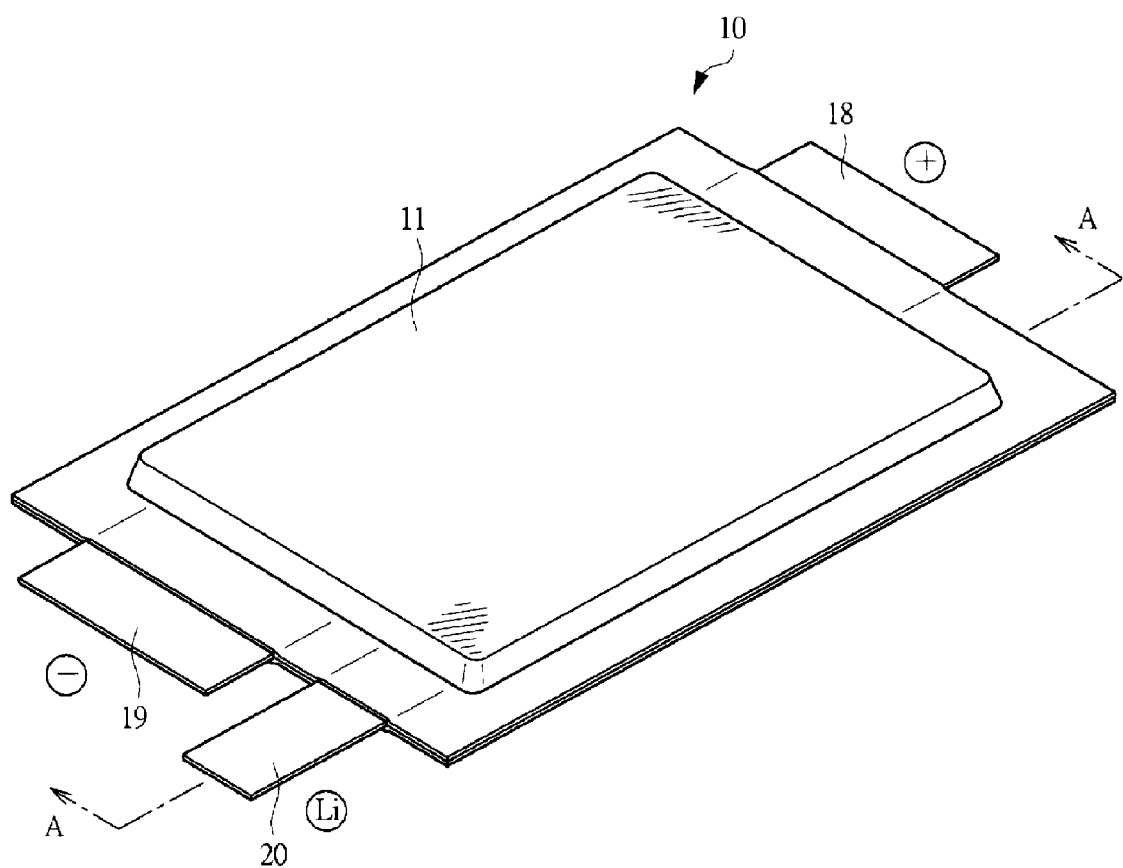
FIG. 1 is a perspective view showing an electric storage device according to one embodiment of the present invention.
Figure 2:
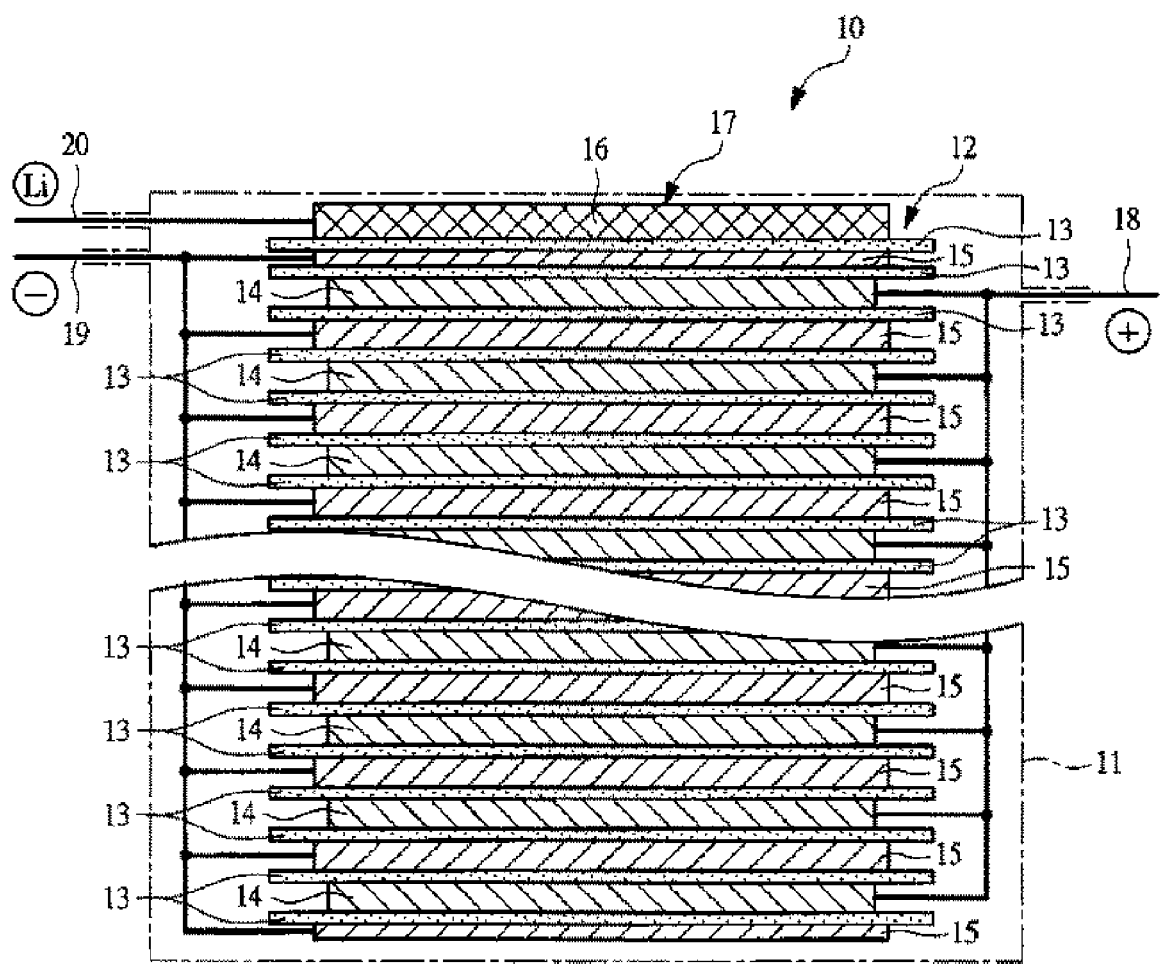
FIG. 2 is a cross-sectional view schematically showing an internal structure of the electric storage device along A-A line in FIG. 1.

FIG. 1 is a perspective view showing an electric storage device 10 according to one embodiment of the present invention, while FIG. 2 is a cross-sectional view schematically showing the internal structure of the electric storage device 10 along a line A-A in FIG. 1. As shown in FIGS. 1 and 2, an electrode laminate-unit 12 is arranged inside of a laminate film 11 composing an outer casing of the electric storage device 10, wherein the electrode laminate unit 12 is composed of positive electrodes 14 and negative electrodes 15, which are alternately laminated with separators 13 interposed therebetween. A lithium electrode (ion supply source) 16 is arranged at the outermost part of the electrode laminate unit 12 so as to oppose to the negative electrode 15, whereby the electrode laminate unit 12 and the lithium electrode 16 form a three-electrode laminate unit 17. An electrolyte composed of an aprotic organic solvent containing a lithium salt is injected into the laminate film 11.

Figure 3:
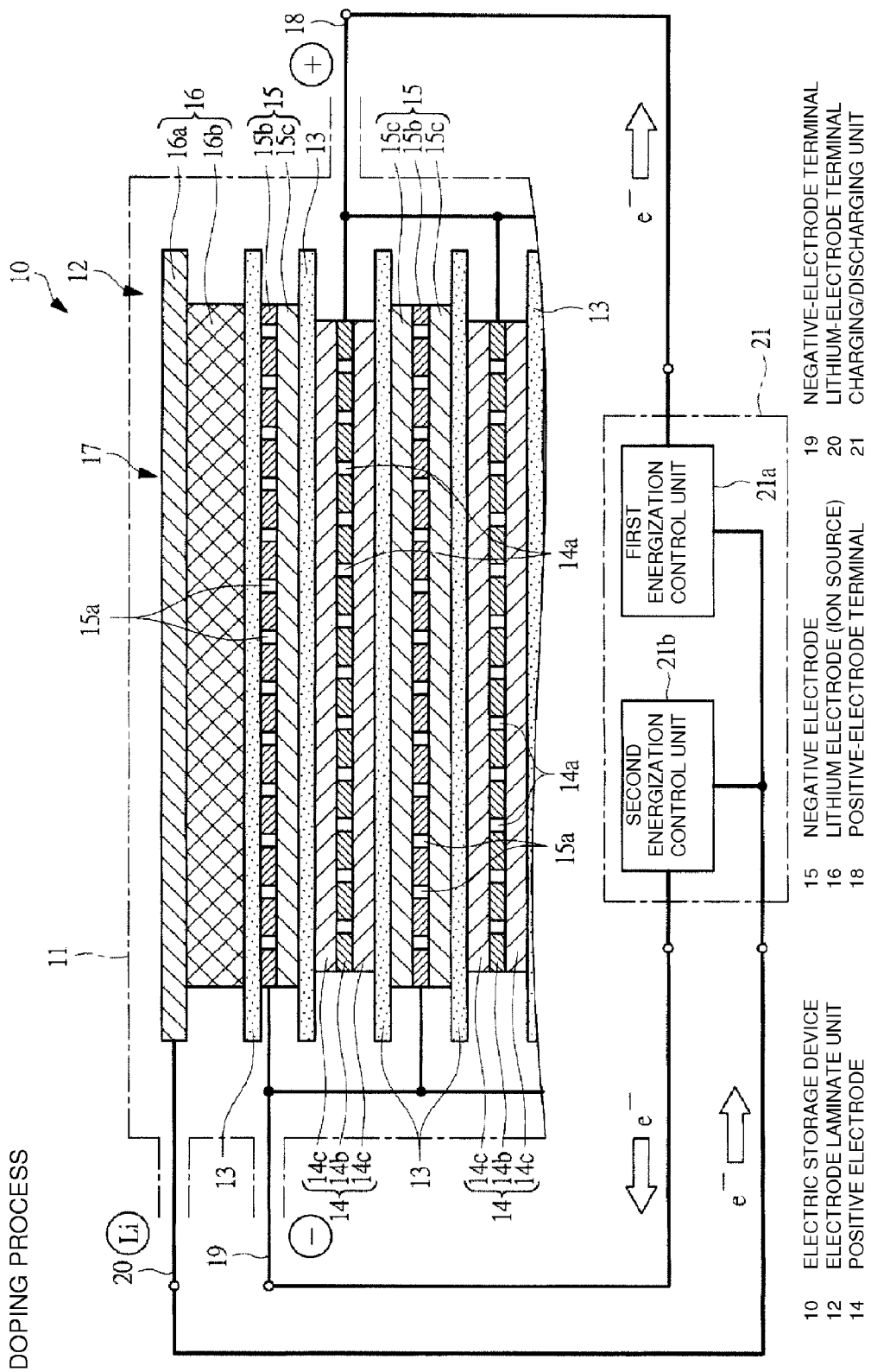
FIG. 3 is a cross-sectional view of the internal structure of the electric storage device as partially enlarged.

FIG. 3 is a cross-sectional view showing the internal structure of the electric storage device 10 as partially enlarged. As shown in FIG. 3, the positive electrode 14 has a positive-electrode current collector 14b having a number of through holes 14a formed thereto and a positive electrode mixture layer 14c coated on the positive-electrode current collector 14b. The negative electrode 15 has a negative-electrode current collector 15b having a number of through holes formed thereto and a negative-electrode mixture layer 15c coated on the negative-electrode current collector 15b. A positive-electrode terminal 18 externally projecting from the laminate film 11 is connected to the plural positive-electrode current collectors 14b, which are connected to each other, while a negative-electrode terminal 19 externally projecting from the laminate film 11 is connected to the plural negative-electrode current collectors 15b, which are connected to each other. The lithium electrode 16 arranged at the outermost part of the electrode laminate unit 12 is composed of a lithium-electrode current collector 16a made of a conductive porous body such as a stainless mesh, and a metal lithium 16b adhered thereon. A lithium-electrode terminal 20 projecting from the laminate film 11 is connected to the lithium-electrode current collector 16a. The lithium electrode 16 is arranged at the upper end of the electrode laminate unit 12, but the lithium electrode 16 can be arranged at both of the upper end and the lower end of the electrode laminate unit 12.

The positive-electrode mixture layer 14c of the positive electrode 14 contains a vanadium oxide as a positive-electrode active material that allows lithium ions to be reversibly doped thereinto and dedoped therefrom, while the negative-electrode mixture layer 15c of the negative electrode 15 contains a natural graphite as a negative-electrode active material that allows lithium ions to be reversibly doped thereinto and dedoped therefrom. The lithium ions from the metal lithium 16b are doped into the negative-electrode mixture layer 15c of the negative electrode 15 in accordance with the procedure described below, whereby the potential of the negative electrode 15 is decreased to enhance the energy density of the electric storage device 10. In the specification of the present invention, the term "dope" involves "occlude", "carry", "absorb" or "insert", and specifically a phenomenon where lithium ions and/or anions enter the positive-electrode active material or the negative-electrode active material. The term "dedope" involves "release" and "desorb", and specifically a phenomenon where lithium ions or anions desorb from the positive-electrode active material or the negative-electrode active material.

Next, a procedure for doping lithiumions into the negative electrode 15 will be explained. As shown in FIG. 3, a charging/discharging unit 21 such as a charging/discharging apparatus, coulometer, is connected to the positive-electrode terminal 18, the negative-electrode terminal 19 and the lithium electrode terminal 20 of the electric storage device 10. The charging/discharging unit 21 includes a first energization control unit 21a for controlling the energizing state between the positive electrode 14 and the lithium electrode 16, and a second energization control unit 21b for controlling the energizing state between the negative electrode 15 and the lithium electrode 16. The first energization control unit 21a is an energization control unit for the positive electrode, and the second energization control unit 21b is an energization control-unit for the negative electrode. The electrons are moved from the lithium electrode 16 to the positive electrode 14 and the lithium ions are doped from the lithium electrode 16 into the positive electrode 14 by controlling the energizing state to a predetermined energizing state (e.g., 0.1 C, 4.2 V) with the use of the first energization control unit 21a. The electrons are moved from the lithium electrode 16 to the negative electrode 15 and the lithium ions are doped from the lithium electrode 16 into the negative electrode 15 by controlling the energizing state to a predetermined energizing state (e.g., 0.1 C, 10 mV) with the use of the second energization control unit 21b. The energizing state to the positive electrode 14 or the negative electrode 15 is appropriately set on the basis of the charging/discharging characteristic of the positive-electrode active material or the negative-electrode active material from the viewpoint of preventing the degradation of the electric storage device 10 or enhancing the doping speed. In particular, it is important to appropriately control the energizing state to the positive electrode 14, since the positive electrode 14 can be brought into an over discharge state to be degraded if excessive lithium ions are doped into the positive electrode 14.

Not only the lithium ions are doped into the negative electrode 15 from the lithium electrode 16 but also the lithium ions are doped into the positive electrode 14 from the lithium electrode 16, whereby the time taken for doping the lithium ions can remarkably be shortened. Specifically, when the lithium ions are doped into either one of the positive electrode 14 and the negative electrode 15, a charge transfer resistance increases with the increase in the charge/discharge depth, so that the doping speed of the lithium ions is considerably decreased toward the final stage of the doping process. On the other hand, when the lithium ions are doped into both of the positive electrode 14 and the negative electrode 15 according to the present invention, the each doping amount of the lithium ions to the positive electrode 14 and the negative electrode 15 can be reduced. Therefore, the lithium ions can efficiently be doped within a range of a charge/discharge depth where the doping speed never considerably lowers. Since the doping time can significantly be shortened as described above, the productivity of the electric storage device 10 can be enhanced, and further, the fabrication cost of the electric storage device 10 can be reduced.

Figure 4:
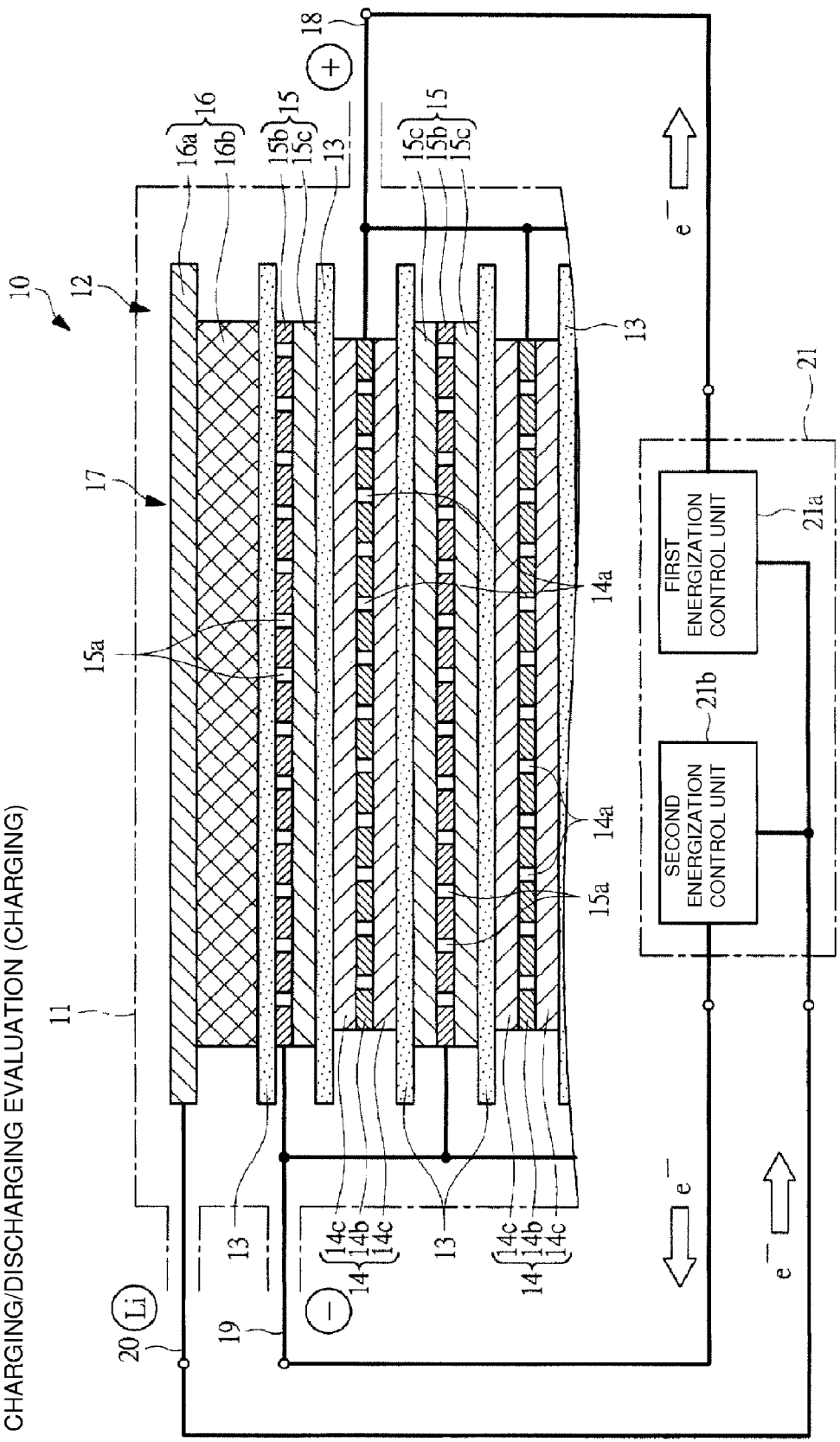
FIG. 4 is an explanatory view showing the status of the implementation of a charging process involved with a charging/discharging evaluation.

The positive electrode 14 and the negative electrode 15 are connected to each other by the switching operation of the charging/discharging unit 21 in order to dope the lithium ions, which are doped into the positive electrode 14, into the negative electrode 15 after the doping process described above is completed, whereby the charging/discharging evaluation of the electric storage device 10 is started. FIG. 4 is an explanatory view showing the status of the implementation of a charging process involved with the charging/discharging evaluation. As shown in FIG. 4, by starting the charging/discharging evaluation so as to implement the charging process to the electric storage device 10, the electrons are moved from the positive electrode 14 to the negative electrode 15, as well as the lithium ions are doped into the negative electrode 15 from the positive electrode 14. The positive-electrode current collector 14b and the negative-electrode current collector 15b have a number of through holes 14a and 15a. The lithium ions can freely move between each electrode through the through holes 14a and 15a, whereby the lithium ions can smoothly be doped into all of the laminated positive-electrode mixture layer 14c and the negative-electrode mixture layer 15c.

Figure 5:
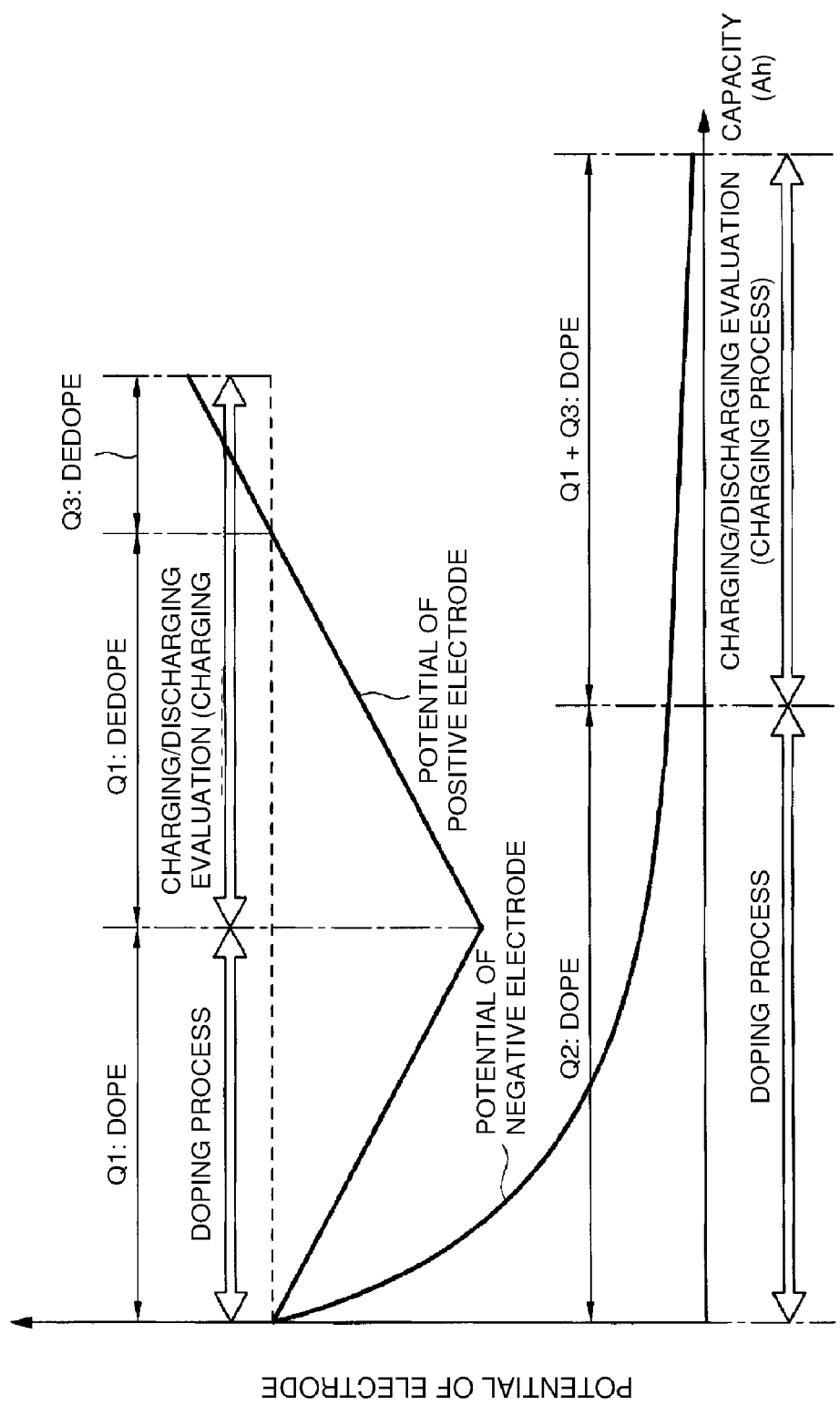
FIG. 5 is a graph showing a relationship between a potential of an electrode and a doping capacity of lithium ions.

FIG. 5 is a graph showing a relationship between the potential of the electrodes and the doping amount of lithium ions. Q1 represents the amount of the lithium ions doped into the positive electrode 14, Q2 represents the amount of the lithium ions doped into the negative electrode 15, and Q3 represents the amount of the lithium ions doped during the fabrication of the later-described positive-electrode active material. As shown in FIG. 5, when the lithium ions start to be doped into the positive electrode 14, and then the doping amount is judged to reach the predetermined value Q1 on the basis of the decreased state of the potential of the positive electrode, the connection state between the positive electrode 14 and the lithium electrode 16 is canceled by the first energization control unit 21a, with the result that the doping process for the positive electrode 14 is completed. Similarly, when the lithium ions are started to be doped into the negative electrode 15, and then the doping amount is judged to reache the predetermined value Q2 on the basis of the decreased state of the potential of the negative electrode, the connection state between the negative electrode 15 and the lithium electrode 16 is canceled by the second energization control unit 21b, with the result that the doping process for the negative electrode 15 is completed. Specifically, the doping process for the electric storage device 10 is completed at the point when the doping amount for the positive electrode 14 reaches Q1 and the doping amount for the negative electrode 15 reaches Q2. Then, the charging/discharging evaluation process for executing the charging/discharging process to the electric storage device 10 is started, whereby the lithium ions are dedoped from the positive electrode 14 in the predetermined amount of (Q1+Q3), and the lithium ions in the predetermined amount of (Q1+Q3) are doped into the negative electrode 15.

The electric storage device 10 described above will be explained in detail in the order described below: [A] positive electrode, [B] negative electrode, [C] positive-electrode current collector and negative-electrode current collector, [D] lithium electrode, [E] separator, [F] electrolyte, [G] outer casing.

[A] Positive Electrode

The positive electrode 14 has the positive-electrode current collector 14b and the positive-electrode mixture layer 14c formed integral with the positive-electrode current collector 14b. A vanadium oxide (e.g., vanadium pentoxide, or vanadium pentoxide containing lithium) is contained in the positive-electrode mixture layer 14c as the positive-electrode active material. The positive-electrode active material is not particularly limited, so long as it allows ions to be reversibly doped thereinto and dedoped therefrom. Examples of the positive-electrode active materials include a metal oxide, active carbon, conductive polymer, polyacene-based substance.

The vanadium oxide as the positive-electrode active material is a layered crystal material having a layered structure. For example, in the vanadium pentoxide ($V_2O_5$), a pentahedral unit having $VO_5$ as one unit extends in two-dimensional direction with a covalent bond to thereby form one layer. These layers are superimposed to form a layered structure as a whole. The vanadium oxide is macroscopically amorphousized with the layered crystal structure maintained, whereby microfabricated layered crystal particles are formed. The state of the layered crystal substance described above is as follows. Specifically, from the microscopic point of view in which an observation with an order of not more than nm can be carried out, only the crystal structure of which layer length is not more than 30 nm is confirmed, or the state in which the crystal structure described above and the amorphous structure are both present is confirmed. However, in a case where this state is observed from a macroscopic point of view in which an observation with an order of $\mu m$ greater than nm can be carried out, the amorphous structure in which the crystal structure is irregularly arranged is observed.

Figure 6:
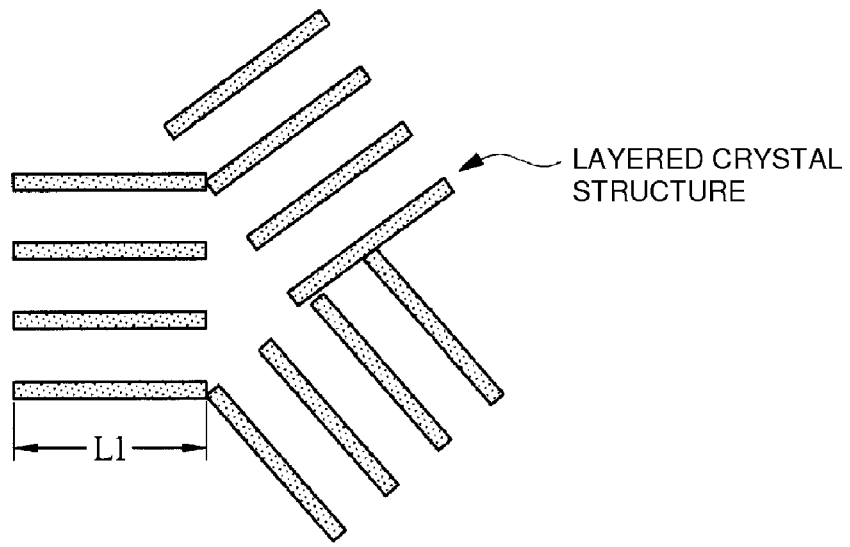
FIG. 6 is a schematic diagram showing a layered crystal structure having a short layer length.
Figure 7:
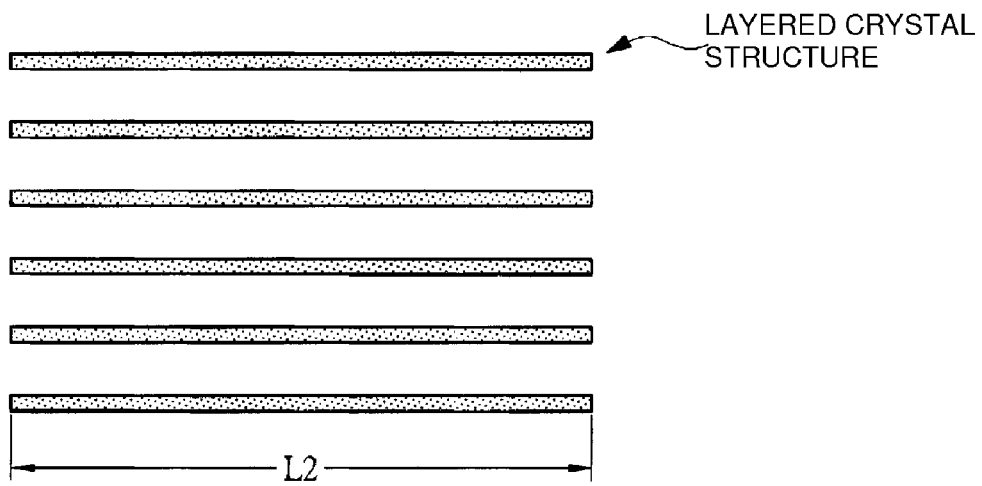
FIG. 7 is a schematic diagram showing a layered crystal structure having a long layer length.

FIG. 6 is a schematic diagram showing the layered crystal structure having a short layer length, while FIG. 7 is a schematic diagram showing the layered crystal structure having a long layer length. As shown in FIG. 6, in the partially amorphousized vanadium oxide, a layered crystal structure (so-called short-period structure) having a short layer length L1 is formed. On the other hand, in the case of FIG. 7, a layered crystal structure (so-called long-period structure) having a long layer length L2 is formed. When the layered crystal structure having the short layer length as shown in FIG. 6 is applied to an electrode active material, ions easily come in between the layers of the layered crystal structure or easily go out between the layers of the layered crystal structure, resulting in that the charging/discharging characteristic or cycle characteristic can be enhanced.

The positive-electrode active material sometimes contains a sulfur-containing conductive polymer during the fabrication. Although the detail is unclear, it is considered that, when a monomer corresponding to the sulfur-containing conductive polymer is present, this monomer allows the oxygen concentration of the reaction system to be constant as an oxygen inhibitor so as to control the structure of the produced amorphous metal oxide doped with a lithium ion. However, the sulfur-containing conductive polymer at the time of completing the reaction has poor performance as an active material. Therefore, it is considered that the performance of the active material is enhanced by removing the sulfur-containing conductive polymer with a method of a decompression and concentration, or a method of spraying and drying, from a final product. The sulfur-containing conductive polymer can be contained in a ratio of 1 to 30% of the metal oxide during the fabrication.

The positive-electrode active material can be synthesized by heating the vanadium oxide, which is a layered crystal material, with the monomer corresponding to the sulfur-containing conductive polymer under the presence of a soluble lithium ion source. For example, the positive-electrode active material can easily be synthesized by heating and refluxing the materials described above. Further, the sulfur component can easily be removed by decompressing and concentrating the refluxed suspension or by spraying and drying the refluxed suspension. The positive-electrode active material of which layer length is reduced to allow the ions to easily come therein or go out therefrom can be doped with lithium ions during the process of the fabrication of the positive-electrode active material. Examples of the lithium ion source used during the fabrication of the positive-electrode active material include soluble lithium sulfide, lithium hydroxide, lithium selenide, lithium telluride. From the viewpoint of toxicity and cost, lithium sulfide and lithium hydroxide are particularly preferable.

The soluble lithium ion source is dissolved in water to exhibit alkalinity, and the metal oxide, such as the vanadium oxide, available as a normal crystal (layered) compound is dissolved into the alkaline solution to be amorphousized. Additionally, the lithium ions are taken into the amorphousized metal oxide. The vanadium oxide can be dissolved by hydrogen peroxide. The copresence state according to the present invention in which the amorphous state and the layered crystal state whose layer length is short are microscopically copresent, although being amorphous state macroscopically, can be produced even by using the hydrogen peroxide. In this case, the solution exhibits acidity. The metal oxide, such as the vanadium oxide, available as a normal crystal (layered) compound is dissolved into the oxidation aqueous solution, whereby the amorphousization is proceeded to thereby form the layered structure having a predetermined layer length.

Figure 8:
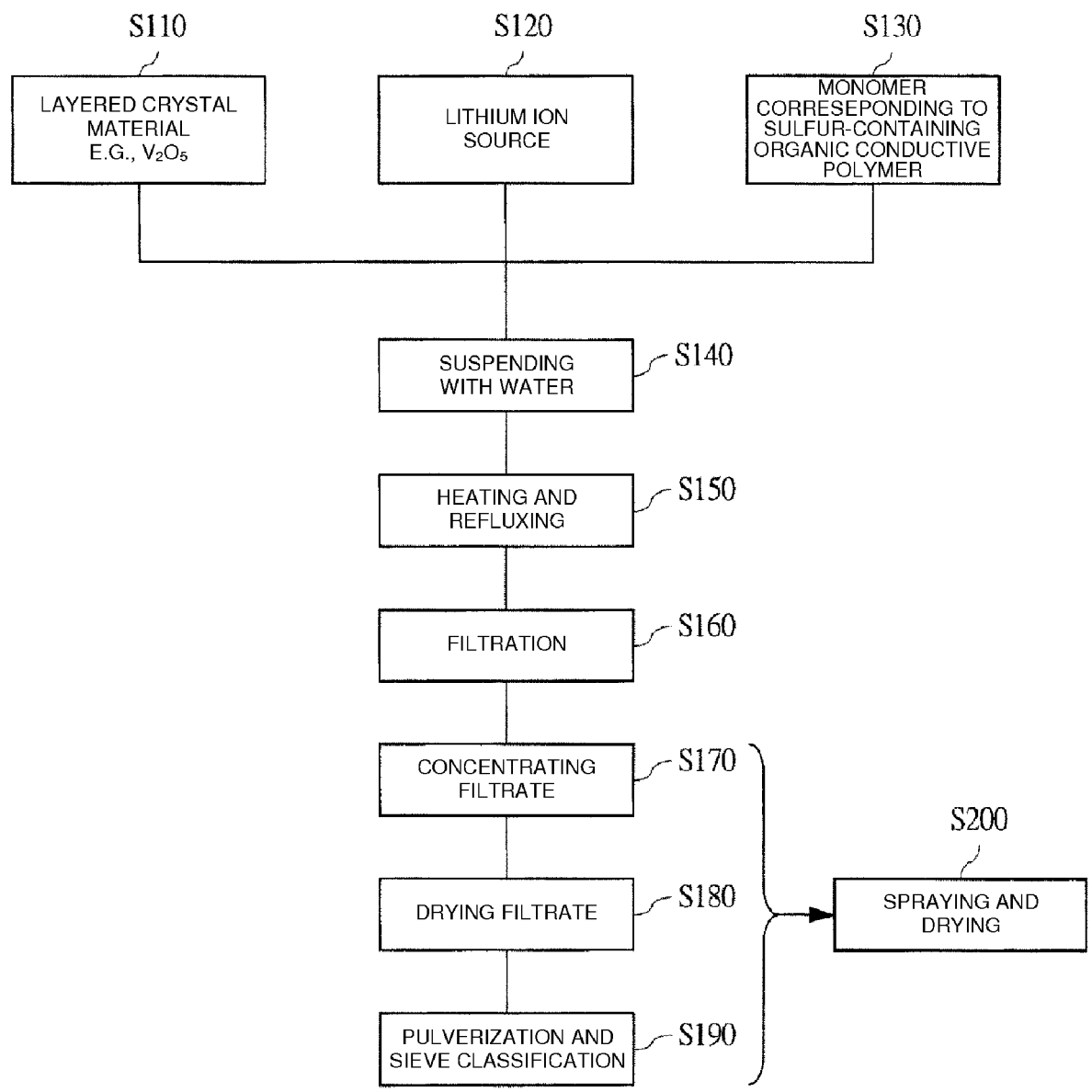
FIG. 8 is a flowchart showing one example of a fabrication process of a positive-electrode active material having the layered crystal structure with a short layer length.

The positive-electrode active material that becomes the layered crystal structure having the short layer length described above is fabricated through the fabrication process shown in FIG. 8. Specifically, as shown in FIG. 8, vanadium pentoxide ($V_2O_5$) is prepared, for example, as a layered crystal material at step S110. The soluble lithium ion source is prepared at step S120. A monomer corresponding to the sulfur-containing organic conductive polymer is prepared at step S130. At the next step S140, the vanadium pentoxide, the soluble lithium ion source and the monomer corresponding to the sulfur-containing organic conductive polymer are suspended in water, whereby amorphousization of the vanadium pentoxide is started. Then, the suspension is heated and refluxed at step S150, and at the subsequent step S160, the solid content is removed from the heated and refluxed suspension by a filtration. The filtrate in which the solid content is removed is concentrated at step S170, and then, dried by means of a vacuum drying at step S180. Thereafter, at step S190, the resultant is pulverized to have a predetermined particle size by means of a ball mill or the like, and sieved to be classified. Alternatively, the processes at steps S170 to S190 are performed by means of a spray drying or the like as shown in S200. In this manner, a powder of the vanadium oxide having the layered crystal structure with a short layer length can be obtained as the positive-electrode active material.

In a case where the heating treatment is performed in the processes at steps S110 to S190, it is necessary to set the heating temperature to be less than 250° C. When the heating temperature exceeds 250° C., the layered crystal having a short layer length can be unpreferably changed. It was confirmed that, when the positive-electrode active material had at least 30% or more of the layered crystal state in which the layer length of the layered crystal particles was not more than 30 nm, in terms of the area % at any cross-section, the initial discharging capacity or capacity retention ratio upon 50 cycles was more satisfactory than the case of containing the layered crystal structure having a layer length exceeding 30 nm. Further, it is enough that the layered crystal state is contained in an amount of 30% or more and less than 100% in terms of area %, wherein the value of nearly 100% is effective with respect to the upper limit. In the case of 100%, the amorphous state is not present, and only the layered crystal state is present. However, it is considered that the layered crystal particles having the layer length of not more than 30 nm are sufficiently effective even if the layered crystal state in which the layer length of the layered crystal particles is not more than 30 nm is contained in 100%.

Figure 9:
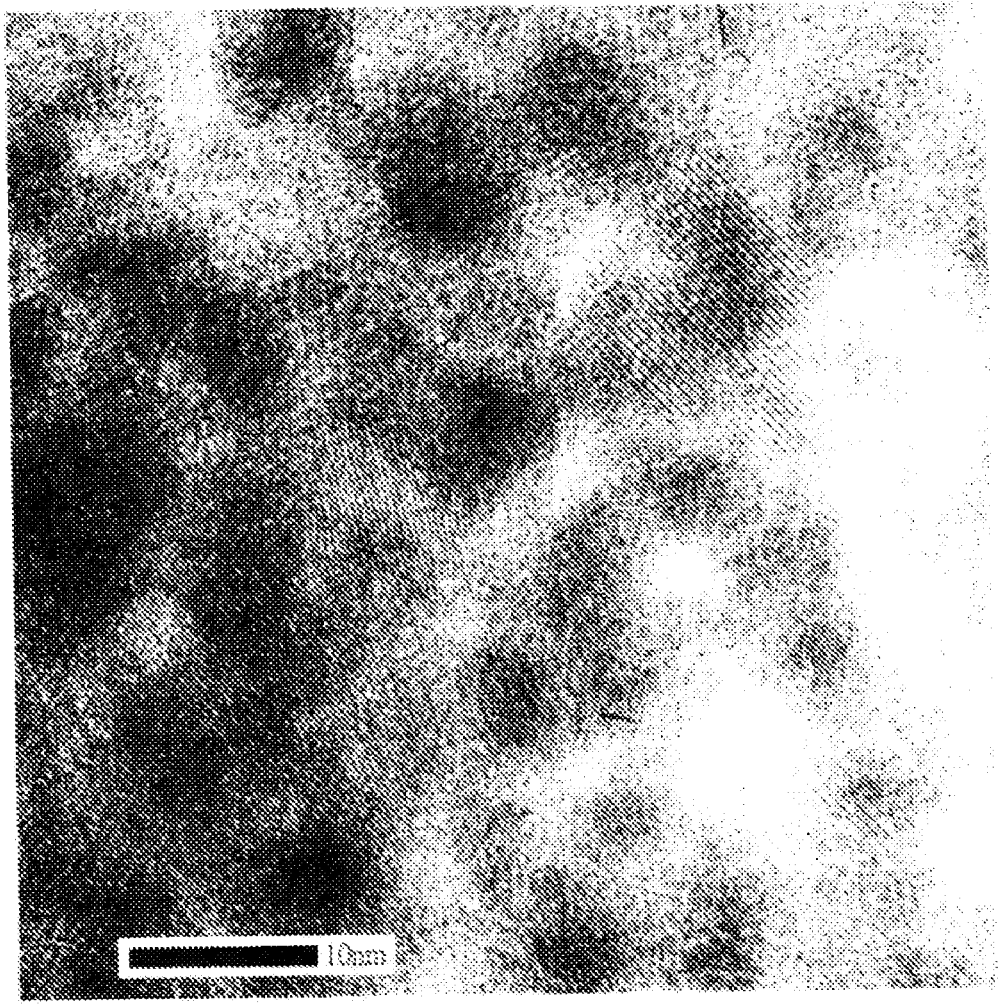
FIG. 9 is a photograph, as a substitute for a drawing, by a transmission electron microscope (TEM) showing a positive-electrode active material having a layered crystal structure with a short layer length.

The minimum layer length of the layered crystal structure only has to be 1 nm or more. From the viewpoint of the coming in and going out of the lithium ions between layers, the following problems arise with respect to the layered crystal state. Specifically, when the layer length of the layered crystal is less than 1 nm, the lithium ions cannot be doped or dedoped, so that the high capacity cannot be taken out. On the contrary, when the layer length exceeds 30 nm, the crystal structure is broken by the charging/discharging, so that the cycle characteristic is deteriorated. Therefore, it is desirable that the layer length is 1 nm or more and 30 nm or less. More preferably, the layer length is 5 nm or more and 25 nm or less. FIG. 9 is a photograph, as a substitute for a drawing, by a transmission electron microscope showing a positive-electrode active material having a layered crystal structure with a layer length of 5 nm or more and 25 nm or less. The positive-electrode active material shown in FIG. 9 is a vanadium oxide.

The positive-electrode active material described above is formed into a powdery shape, granular shape, short fibrous shape, or the like, and this positive-electrode active material is mixed with a binder to form a slurry. The slurry containing the positive-electrode active material is coated on the positive-electrode current collector 14b and the resultant is dried, whereby the positive-electrode mixture layer 14c is formed on the positive-electrode current collector 14b. Usable binders mixed with the positive-electrode active material include a rubber binder such as SBR, a fluorine-containing resin such as polytetrafluoroethylene, polyvinylidene fluoride, and a thermoplastic resin such as polypropylene, polyethylene. A conductive material such as acetylene black, graphite, metal powder can appropriately be added to the positive-electrode mixture layer 14c.

[B] Negative Electrode

The negative electrode 15 has the negative-electrode current collector 15b and the negative-electrode mixture layer 15c formed integral with the negative-electrode current collector 15b, wherein a natural graphite is contained in the negative-electrode mixture layer 15c as the negative-electrode active material. The negative-electrode active material is not particularly limited, so long as it allows ions to be reversibly doped thereinto and dedoped therefrom. Examples of the negative-electrode active material include graphite, various carbon materials, polyacene-based material, tin oxide, silicon oxide. The graphite and soft carbon material are preferable, since they can be formed into a thick film and have excellent cycle characteristic.

The negative-electrode active material described above, such as natural graphite, is formed into a granular shape or short fibrous shape. This negative-electrode active material is mixed with a binder to form a slurry. The slurry containing the negative-electrode active material is coated on the negative-electrode current collector 15b and the resultant is dried, whereby the negative-electrode mixture layer 15c is formed on the negative-electrode current collector 15b. Usable binders mixed with the negative-electrode active material include a fluorine-containing resin such as polytetrafluoroethylene, polyvinylidene fluoride, and a thermoplastic resin such as polypropylene, polyethylene. The fluorine-based binder is preferably used. Examples of the fluorine-based binder include polyvinylidene fluoride, copolymer of vinylidene fluoride and trifluoroethylene, copolymer of ethylene and tetrafluoroethylene, and copolymer of propylene and tetrafluoroethylene. A conductive material such as acetylene black, graphite, and metal powder, may appropriately be added to the negative-electrode mixture layer 15c.

[C] Positive-Electrode Current Collector and Negative-Electrode Current Collector The positive-electrode current collector 14b and the negative-electrode current collector 15b preferably have through holes 14a and 15a penetrating therethrough. Examples thereof include an expanded metal, a punching metal, a net, and a foam. The shape and number of the through hole are not particularly limited, and they can be appropriately set so long as they do not hinder the movement of the lithium ions. Various materials generally proposed for an organic electrolyte battery can be employed as the material of the negative-electrode current collector 15b and the positive-electrode current collector 14b. For example, aluminum, stainless steel, or the like can be used as the material of the positive-electrode current collector 14b, and stainless steel, copper, nickel, or the like can be used as the material of the negative-electrode current collector 15b.

[D] Lithium Electrode

The lithium electrode 16 has the lithium electrode current collector 16a composed of a conductive porous body such as a stainless mesh, and the metal lithium 16b adhered thereon. Instead of the metal lithium 16b constituting the lithium ion source, an alloy that can supply lithium ions, such as lithium-aluminum alloy can be employed. The lithium-electrode current collector 16a can be formed by using the material same as those of the negative-electrode current collector 15b or the positive-electrode current collector 14b. Although the metal lithium 16b decreases as discharging the lithium ions, and finally, all amounts are doped into the positive-electrode mixture layer 14c and the negative-electrode mixture layer 15c, the metal lithium 16b is arranged in a slightly larger amount in order that a part thereof can remain in the electric storage device 10.

[E] Separator

A porous member or the like having durability with respect to the electrolyte, the positive-electrode active material, the negative-electrode active material or the like, having through holes and having no conductivity can be used for the separator 13. Generally, a cloth, nonwoven fabric, or porous body made of glass fiber, polyethylene, polypropylene, or the like is used. The thickness of the separator 13 is preferably thin in order to decrease the internal resistance of the battery, but it can appropriately be set considering the holding amount of the electrolyte, circulation property, strength, or the like. The later-described electrolyte is impregnated into the separator 13.

[F] Electrolyte

It is preferable that an aprotic organic solvent containing a lithium salt is used for the electrolyte from the viewpoint that an electrolysis is not produced even by a high voltage and lithium ions can stably be present. Examples of the aprotic organic solvent include ethylene carbonate, propylene carbonate, dimethyl carbonate, diethyl carbonate, γ-butylorac-tone, acetonitrile, dimethoxyethane, tetrahydrofuran, dioxolane, methylene chloride, sulfolane, wherein these material are used singly or mixed with one another. Examples of the lithium salt include $CF_3SO_3Li$, $C_4F_9SO_8Li$, $(CF_3SO_2)_2NLi$, $(CF_3SO_2)_3CLi$, $LiBF_4$, $LiPF_6$, $LiClO_4$.

[G] Outer Casing

Various materials generally used for a battery can be used for the outer casing. A metal material such as iron or aluminum can be used, and a film material or the like can be used. The shape of the outer casing is not particularly limited. The outer casing can be formed into a shape appropriately selected according to the purpose, such as a cylindrical shape or rectangular shape. From the viewpoint of miniaturization or weight saving of the electric storage device 10, it is preferable to use the film-type outer casing employing an aluminum laminate film 11. In general, a three-layered laminate film having a nylon film at the outer part, an aluminum foil at the middle part, and an adhesive layer such as a denatured polypropylene at the inner part is used. The laminate film 11 is generally deep-drawn according to a size of an electrode inserted therein. A three-electrode laminate unit 17 is placed in the deep-drawn laminate film 11, the electrolyte is injected, and then, the outer peripheral portion of the laminate film 11 is sealed by a thermal welding.

The present invention will be explained in detail with reference to examples.

EXAMPLES

Example 1

Figures 10, 11:
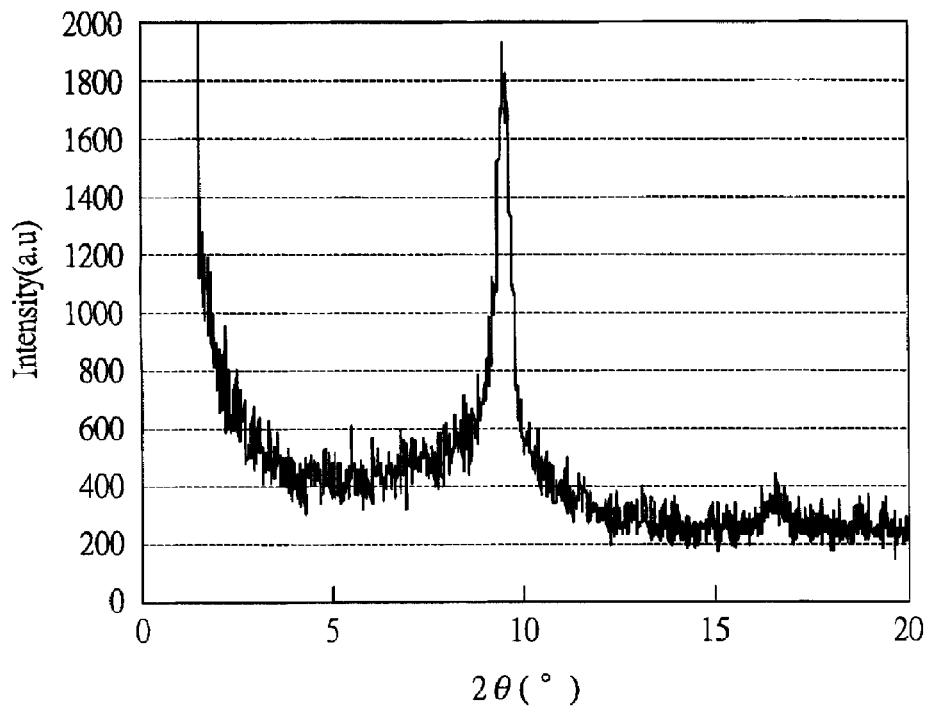
FIG. 10 is a graph showing the result of an X-ray crystal diffraction analysis of the positive-electrode active material having a layered crystal structure with a short layer length.
FIG. 11 is a table showing results of a test for a doping time with respect to Example 1, Comparative Example 1, and Comparative Example 2.

200 g of vanadium pentoxide ($V_2O_5$) as a layered crystal material, 30 g of lithium sulfide ($Li_2S$) as a soluble lithium ion source, and 100 g of 3,4-ethylene dioxythiophene (EDOT), as a monomer for a sulfur-containing conductive polymer were suspended in 5 l of water to obtain a suspension. The obtained suspension was heated, stirred and refluxed for 24 hours. After the stirring, suction filtration was performed to remove solid contents from the suspension. The solid contents were polymers of sulfur and 3,4-ethylene dioxythiophene. The filtrate from which the solid contents were removed was sprayed and dried by a four-fluid nozzle under a dry atmosphere of 130° C. so as to obtain black spheroidal particles. The resultant product was vacuum dried at 150° C. to obtain a positive-electrode active material. As shown in FIG. 10, it was confirmed that this positive-electrode active material had a peak at around the diffraction angle 2θ of 10° as a result of the X-ray crystal diffraction analysis. Further, it was confirmed that the lithium ions were taken therein according to an ICP analysis. It was confirmed that the amount of carbons was 1% or less by an elemental analysis. The result of observing this product with a transmission electron microscope is shown in FIG. 9 described above. It was confirmed from FIG. 9 that the layered crystal particles having a layer length of 5 nm or more and 25 nm or less were randomly aggregated, wherein the area ratio thereof was 99%.

89.5% by weight of the positive-electrode active material was mixed with 7% by weight of conductive Ketchen Black as a conductive material and 3.5% by weight of acrylic copolymer as a binder to obtain a slurry with N-methylpyrrolidone (NMP) used as a solvent. This slurry was coated on both surfaces of a positive-electrode current collector (made of aluminum) having through holes. The resultant was vacuum dried at 150° C., and then, formed to have a thickness of 180 μm by press. Subsequently, the formed material was cut into 38 mm×24 mm, and then, a positive-electrode terminal (made of aluminum) was welded to the non-coated portion to fabricate a positive electrode.

Next, a natural graphite whose surface was deactivated and polyfluorovinylidene (PVDF) as a binder were mixed in a weight ratio of 94:6. The resultant was suspended with NMP to prepare a slurry. This slurry was coated on both surfaces or one surface of a negative-electrode current collector (made of copper) having through holes to have a thickness of 220 μm, and then, the resultant was pressed and dried at 120° C. Then, the dried material was cut into 40 mm×26 mm, and then, a negative-electrode terminal (made of nickel) was welded to the non-coated portion to fabricate a negative electrode 15.

The twelve positive electrodes and thirteen negative electrodes (in which two of them have one coated surface) thus fabricated were laminated with a polyolefin microporous film interposed therebetween as a separator. Further, a lithium electrode formed by adhering metal lithium onto a stainless porous foil was arranged at the outermost layer with an interposed separator, whereby three-electrode laminate unit having the positive electrode, negative electrode, lithium electrode, and separator was fabricated. The three-electrode laminate unit was packaged by an aluminum laminate film, and then, an electrolyte obtained by dissolving lithium fluoroborate ($LiBF_4$) at 1 mol/l into solvent mixture containing ethylene carbonate (EC) and diethyl carbonate (DEC) at the weight ratio of 1:3 was injected.

After the electric storage device was assembled as described above, the negative electrode and the lithium electrode were connected through the charging/discharging unit, and the positive electrode and the lithium electrode were connected through the charging/discharging unit as shown in the above-mentioned FIG. 3. The positive electrode was charged with a constant current-constant voltage charging mode (0.1 C, 4.2 V), while the negative electrode was charged with a constant current-constant voltage charging mode (0.1 C, 10 mV). As shown in the above-mentioned FIG. 5, it was determined that the doping of the lithium ions to the electric storage device was completed at the time when a predetermined amount Q1 of the lithium ions was doped into the positive electrode, and when a predetermined amount Q2 of the lithiumions was doped into the negative electrode. The doping time taken for the doping to be completed was 13 hours as shown in FIG. 11. A charging/discharging evaluation at 0.1 C discharge was performed to the assembled electric storage device. The initial capacity of the electric storage device was 12 Ah, and the capacity retention ratio after 50 cycles was 92%.

Comparative Example 1

Figure 12:
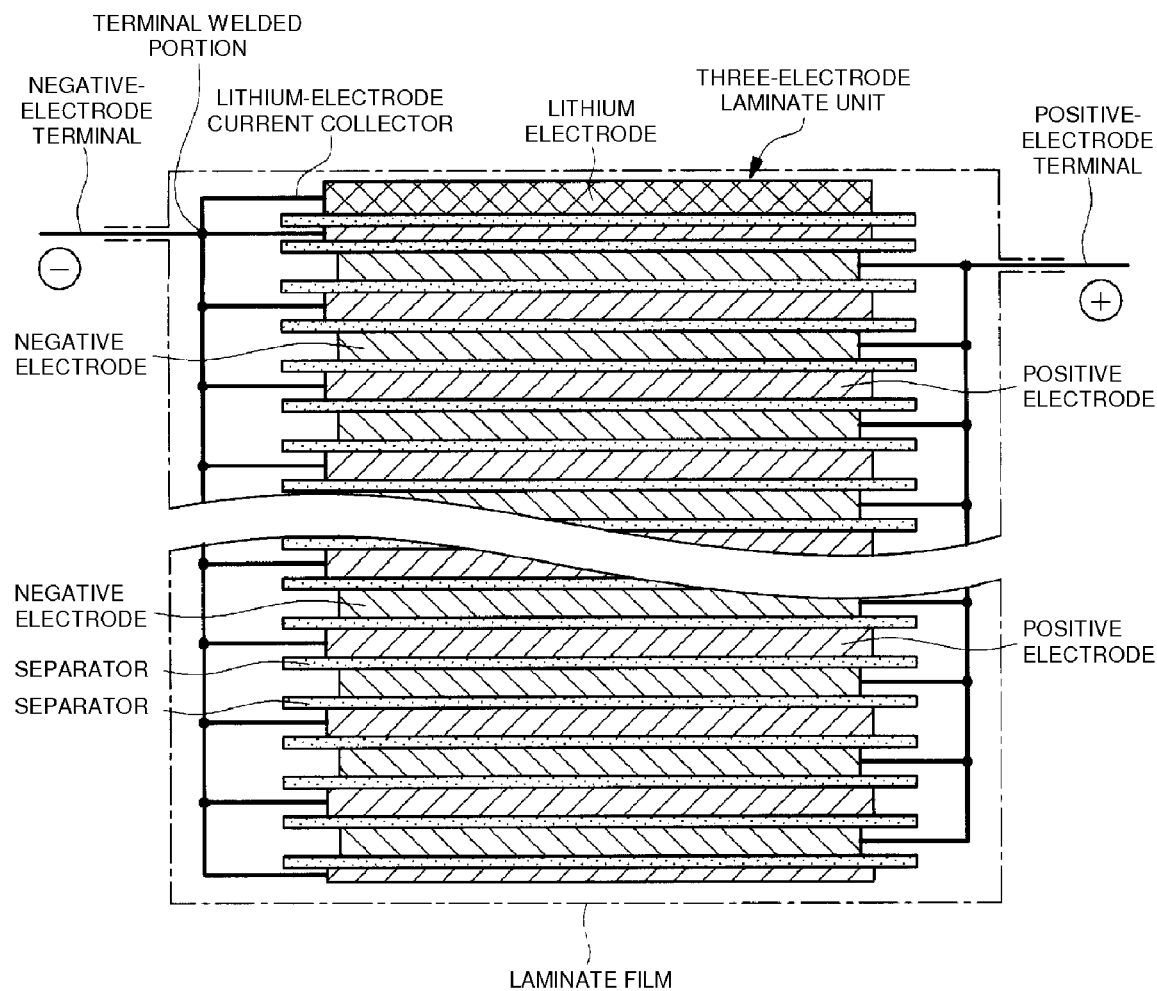
FIG. 12 is a cross-sectional view schematically showing an internal structure of a conventional electric storage device (for Comparative Example 1)

FIG. 12 is a cross-sectional view schematically showing an internal structure of a conventional electric storage device assembled for a comparative example. As shown in FIG. 12, twelve positive electrodes and thirteen negative electrodes (in which two of them have one coated surface) used in Example 1 were laminated with a polyolefin microporous film interposed therebetween as a separator. Further, a lithium electrode formed by adhering metal lithium onto a stainless porous foil was arranged at the outermost layer with a separator, whereby three-electrode laminate unit having the positive electrode, negative electrode, lithium electrode, and separator was fabricated. It is to be noted that the terminal welded portion of a stainless steel porous foil that is the lithium-electrode current collector was resistance-welded to the terminal welded portion of the negative electrode. Therefore, the electric storage device in Comparative Example 1 is the one having two electrodes (positive electrode, negative electrode), although the electric storage device in Example 1 is the one having three electrodes (positive electrode, negative electrode, lithium electrode). Then, the three-electrode laminate unit was packaged by an aluminum laminate film, and then, an electrolyte obtained by dissolving lithium fluoroborate ($LiBF_4$) at 1 mol/l into solvent mixture containing ethylene carbonate (EC) and diethyl carbonate (DEC) at the weight ratio of 1:3 was injected. The lithium ions are started to be doped into the negative electrode by the injection of the electrolyte, whereby a predetermined amount of (Q1+Q2) of the lithium ions was doped into the negative electrode. The result is shown in FIG. 11. It was confirmed from FIG. 11 that, when the lithium ions were doped into only the negative electrode, the doping speed decreased with the decrease in the potential of the negative electrode, so that about 35 hours were needed for doping the lithium ions. Thus, it was impossible to dope the lithium ions in a short doping time as in Example 1.

Figure 13:
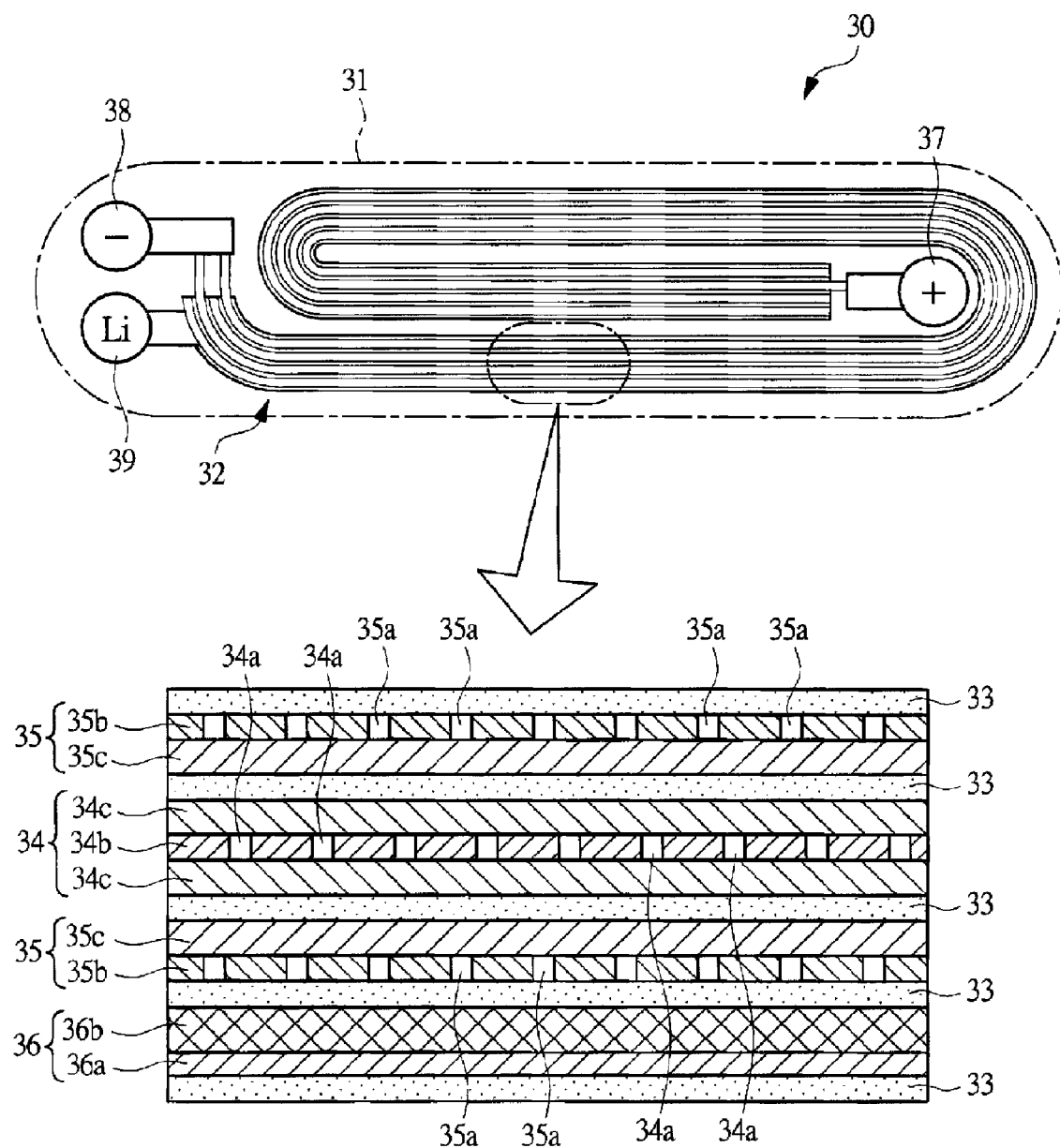
FIG. 13 is a cross-sectional view schematically showing an internal structure of an electric storage device according to another embodiment of the present invention.

The present invention is not limited to the example described above, but various modifications are possible without departing from the scope of the invention. For example, the electric storage device 10 illustrated in the figures is a laminate-type electric storage device 10 in which the positive electrodes 14 and the negative electrodes 15 are alternately laminated, but the invention is not limited to this device structure. For example, the electric storage device can be a wound-type electric storage device in which the positive electrode and negative electrode are wound in a superimposed manner. FIG. 13 is a cross-sectional view schematically showing an internal structure of a wound-type electric storage device 30 according to another example of the present invention.

As shown in FIG. 13, an electrode wound unit 32 and an electrolyte are stored in a metal can 31 constituting an outer casing of the electric storage device 30. This electrode wound unit 32 is formed by winding a positive electrode 34, a negative electrode 35, and a lithium electrode (ion source) 36, those of which are superimposed with separators 33. The positive electrode 34 has a positive-electrode current collector 34b having a number of through holes 34a and a positive-electrode mixture layer 34c coated on the positive-electrode current collector 34b, while the negative electrode 35 has a negative-electrode current collector 35b having a number of through holes 35a and a negative-electrode mixture layer 35c coated on the negative-electrode current collector 35b. The lithium electrode 36 has a lithium-electrode current collector 36a made of a conductive porous member such as a stainless mesh or the like, and a metal lithium 36b adhered thereon. The positive-electrode current collector 34b is connected to a positive-electrode terminal 37, the negative-electrode current collector 35b is connected to a negative-electrode terminal 38, and the lithium-electrode current collector 36a is connected to a lithium-electrode terminal 39. Even in the wound-type electric storage device 30, the doping time can be shortened, like the electric storage device 10 described above, by implementing the doping process in which the positive electrode 34 is connected to the lithium electrode 36 and the negative electrode 35 is connected to the lithium electrode 36.

In the above described description, the lithium ion battery is described in which the vanadium oxide is used as the positive-electrode active material and the natural graphite is used as the negative-electrode active material. However, the present invention is not limited thereto. The present invention is effectively applicable to a battery using other positive-electrode active materials or other negative-electrode active materials. For example, the present invention is effectively applicable to a lithium ion battery in which any one of lithium cobalt oxide ($LiCoO_2$), lithium nickel oxide ($LiNiO_2$), lithium manganese oxide ($LiMnO_2$), complex oxide of these materials ($LiCo_xNi_yMn_zO_2$, x+y+z=1), lithium manganese oxide spinel ($LiMn_2O_4$), lithium vanadium oxide, olivine-type $LiMPO_4$ (M:Co, Ni, Mn, Fe, or the like), $M_xO_y$ ($MnO_4$, $Fe_2O_3$, or the like) is used as the positive-electrode active material; a carbon material made of a soft carbon material or graphite, or non-carbon material made of silicon or tin is used as the negative-electrode active material; and a nonaqueous organic solvent containing lithium salt is used as the electrolyte.

The present invention is also effectively applicable to a lithium ion capacitor in which an active carbon is used as the positive-electrode active material; a carbon material that can reversibly carry lithiumions, such as a graphite, hard carbon, calks, or the like, or polyacene material (PAS) is used as the negative-electrode active material; and a nonaqueous organic solvent containing lithium salt is used as the electrolyte. In this lithium ion capacitor, it is desirable that the lithium ions are doped into the negative-electrode active material in order that the potential of the positive electrode after the short-circuiting between the positive electrode and the negative electrode becomes 2.0 V, from the viewpoint of increasing capacity.

In the case described above, the positive electrode 14 and the lithium electrode 16 are connected through the charging/discharging unit 21, and the negative electrode 15 and the lithium electrode 16 are connected through the charging/discharging unit 21. However, in a case where the charging/discharging characteristic or the amount of the positive-electrode active material or the negative-electrode active material is appropriately designed in order to prevent the over discharge of the positive electrode 14, the positive electrode 14 and the lithium electrode 16 can directly be connected and the negative electrode 15 and the lithium electrode 16 can be directly connected, whereby the lithium ions can be doped into the positive electrode 14 and the negative electrode 15.

What is claimed is:

1. A fabricating method of an electric storage device in which lithium ions are doped into at least one of a positive electrode and a negative electrode from a lithium electrode as an lithium ion source, the method comprising:
    a doping process in which the positive electrode and the lithium ion source are connected to each other and the negative electrode and the lithium ion source are connected to each other so as to dope lithium ions into both of the positive electrode and the negative electrode from the lithium ion source within a range of charge/discharge depth where the doping speed of the lithium ions remains at a constant or smooth rate for the duration of the doping process.

2. The fabricating method according to claim 1, wherein an energizing state between the positive electrode and the lithium ion source is controlled in the doping process by an energization control unit for the positive electrode.

3. The fabricating method according to claim 1, wherein an energizing state between the negative electrode and the lithium ion source is controlled in the doping process by an energization control unit for the negative electrode.

* * * * *